Patented Sept. 30, 1941

2,257,218

UNITED STATES PATENT OFFICE

2,257,218

PROCESS FOR THE PREPARATION OF PAPAIN

Arnold K. Balls, Washington, D. C., Hans Lineweaver, Berkeley, Calif., and Sigmund Schwimmer, Washington, D. C., assignors to Henry A. Wallace, as Secretary of Agriculture of the United States of America, and to his successors in office No Drawing. Application July 11, 1940, Serial No. 344,916

1 Claim. (Cl. 195—68)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

The ordinary method in use for preparing papain consists of drying the latex of the green fruit. We have observed that such preparations are less potent per unit of dry weight than the latex from which they were made. They are also subject to considerable deterioration on storage, even for periods as short as a few weeks. The natural activator of the enzyme system also disappears during the storage of papain as ordinarily prepared.

We have discovered a method by which papain can be prepared in a form that retains nearly all of the original activity of the latex, and may be stored for many months without any apparent deterioration. The natural activator of the proteolytic enzymes, which occurs in the latex in considerable quantity, also remains in our preparation.

To make papain according to our invention, the fresh latex, either before or after it has clotted, is thoroughly mixed with common salt in any manner that permits the salt to dissolve in the water present in the latex. A solution of salt can also be used. The quantity of salt used may vary within wide limits, and also must vary with the water content of the latex, but a convenient and practical amount is (with latex of average water content) one tenth of the weight of the fresh latex.

The latex containing the salt is then partially, but not entirely dried, preferably in a vacuum and at a temperature not over 55° C., and preferably also with occasional agitation to keep it homogeneous. The drying is continued until the water remaining in the latex is nearly saturated, but not entirely saturated, with the added salt. The final percentage of salt in the material may vary considerably without injury to the product. The object of drying as far as possible is merely to get rid of the water, which is excess weight. In practice with a latex that contained originally ten percent of papaya solids, it worked well to dry until the paste contained roughly 25–30 percent of salt, that is, usually until about two thirds of the weight of the salted latex had been lost.

The papain is then put into any suitable airtight container, such as a bottle, an enameled tin or a collapsible tube. When properly made it is a grayish white, thick paste.

Having thus described our invention, what we claim for Letters Patent is:

A method for the preparation of papain, which comprises extracting latex from green fruit; thence adding sodium chloride in the proportion of substantially one-tenth of the weight of the fresh latex; thence agitating the mass; thence subjecting the mass to the action of heat in vacuo at a temperature not exceeding 55° C., the while agitating the mass, thereby removing the excess water present; and thence placing the resulting paste in airtight containers.

ARNOLD K. BALLS.
HANS LINEWEAVER.
SIGMUND SCHWIMMER.